United States Patent
Browne et al.

(10) Patent No.: US 11,152,604 B2
(45) Date of Patent: Oct. 19, 2021

(54) SACRIFICIAL SUBSTRATES FOR SILICON-CARBON COMPOSITE MATERIALS

(71) Applicant: Enevate Corporation, Irvine, CA (US)

(72) Inventors: Ian Russell Browne, Orange, CA (US); Rahul R. Kamath, Mission Viejo, CA (US); Monika Chhorng, Irvine, CA (US); Benjamin Yong Park, Mission Viejo, CA (US)

(73) Assignee: ENEVATE CORPORATION, Irvine, CA (US)

( * ) Notice: Subject to any disclaimer, the term of this patent is extended or adjusted under 35 U.S.C. 154(b) by 186 days.

(21) Appl. No.: 16/430,288

(22) Filed: Jun. 3, 2019

(65) Prior Publication Data

US 2020/0381703 A1    Dec. 3, 2020

(51) Int. Cl.
*H01M 4/04* (2006.01)
*H01M 4/134* (2010.01)
*H01M 4/133* (2010.01)

(52) U.S. Cl.
CPC ......... *H01M 4/0471* (2013.01); *H01M 4/133* (2013.01); *H01M 4/134* (2013.01)

(58) Field of Classification Search
CPC ...... H01M 4/134; H01M 4/0471; H01M 4/04; H01M 4/133
See application file for complete search history.

(56) References Cited

U.S. PATENT DOCUMENTS

| 8,097,185 | B2 | 1/2012 | Miller et al. |
| 9,178,208 | B2 | 11/2015 | Park et al. |
| 9,397,338 | B2 | 7/2016 | Park et al. |
| 10,033,042 | B2 | 7/2018 | Fukumine et al. |
| 2014/0170482 | A1* | 6/2014 | Park .................. H01M 4/13 429/211 |
| 2015/0221935 | A1 | 8/2015 | Zhou et al. |
| 2017/0113934 | A1 | 4/2017 | Kowalewski et al. |
| 2017/0155151 | A1 | 6/2017 | Bae et al. |
| 2019/0160734 | A1* | 5/2019 | Biesboer ................ C08L 33/08 |
| 2019/0305366 | A1* | 10/2019 | Wegener ............... H01M 4/134 |
| 2019/0352542 | A1* | 11/2019 | Schwartz .................. C09J 5/06 |

FOREIGN PATENT DOCUMENTS

WO    2018035481 A1    2/2018

OTHER PUBLICATIONS

Notification of Transmittal of the International Search Report and the Written Opinion of the Intarnational Searching Authority in PCT/US2020/035960, dated Sep. 18, 2020, 9 pages.

* cited by examiner

*Primary Examiner* — Austin Murata
(74) *Attorney, Agent, or Firm* — McAndrews, Held & Malloy, Ltd.

(57) ABSTRACT

Methods of forming a composite material film can include providing a layer comprising a carbon precursor and silicon particles on a sacrificial substrate. The methods can also include pyrolysing the carbon precursor to convert the precursor into one or more types of carbon phases to form the composite material film, whereby the sacrificial substrate has a char yield of about 10% or less.

22 Claims, 5 Drawing Sheets

SACRIFICIAL SUBSTRATES FOR SILICON-CARBON COMPOSITE MATERIALS

BACKGROUND

Field

The present disclosure relates generally to silicon-carbon composite materials. In particular, the present disclosure relates to sacrificial substrates for forming silicon-carbon composite materials. Silicon-carbon composite materials can be used in battery electrodes.

Description of the Related Art

A lithium ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. Typical electrodes include electro-chemically active material layers on electrically conductive metals (e.g., aluminum and copper). Films can be rolled or cut into pieces which are then layered into stacks. The stacks are of alternating electro-chemically active materials with the separator between them.

SUMMARY

In certain implementations, a method of forming a composite material film is provided. The method can include providing a layer comprising a carbon precursor and silicon particles on a sacrificial substrate. The method can also include pyrolysing the carbon precursor to convert the precursor into one or more types of carbon phases to form the composite material film, whereby the sacrificial substrate has a char yield of about 10% or less. For example, the sacrificial substrate can have a char yield of about 7% or less, about 5% or less, about 3% or less, about 1% or less, about 0%, etc.

In various implementations, the sacrificial substrate can comprise polymethylpentene (PMP), acetal copolymer, acrylonitrile butadiene styrene (ABS), paraffin wax, polyethylene oxide, polyethylene, polypropylene, poly(propylene carbonate), cellulose acetate, or a combination thereof. For example, the sacrificial substrate can comprise polyethylene, polypropylene, poly(propylene carbonate), polymethylpentene, or a combination thereof.

In some implementations, the layer can include a mixture comprising a solvent. In some instances, the sacrificial substrate can be insoluble in the solvent. In some instances, the solvent can comprise N-Methylpyrrolidone (NMP). In some instances, the solvent can comprise water. In some such instances, the carbon precursor can comprise a water soluble polymer.

In certain implementations, the method can further comprise drying the mixture on the sacrificial substrate prior to pyrolysing, wherein the dried mixture comprises from about 10% to about 30% of the solvent. In some instances, the method can further comprise forming the dried mixture on the sacrificial substrate into a plurality of dried mixtures on sacrificial substrates, and stacking the plurality prior to pyrolysing.

In some implementations, the method can further comprise providing a mixture on a first substrate. The mixture can comprise a solvent. The method can also comprise drying the mixture and removing the dried mixture prior to providing the dried mixture on the sacrificial substrate. In some instances, the dried mixture can comprise from about 10% to about 30% of the provided solvent. In some instances, the method can further comprise forming the dried mixture into a plurality of dried mixtures. Providing the mixture on the sacrificial substrate can comprise providing a stack of the plurality of dried mixtures on a plurality of sacrificial substrates.

In various implementations, the composite material film can comprise the one or more types of carbon phases at greater than 0% to about 20% by weight. In various implementations, the composite material film can comprise the silicon particles at greater than about 50% to about 99% by weight. In some instances, the composite material film can further comprise graphite particles. In certain implementations, the composite material film can be substantially electrochemically active. In some instances, pyrolysing can form the composite material film as a self-supported structure.

In certain implementations, a method of forming an electrochemical device is provided. The method can include providing a first electrode, a second electrode, and electrolyte. The first electrode can comprise providing the composite material film formed by the provided method of forming a composite material film. In various implementations, providing the first electrode can comprise providing the composite material film as a self-supported electrode. In some implementations, providing the first electrode can comprise providing the composite material film on a current collector. In some instances, the first electrode can be an anode, and the second electrode can be a cathode. The electrochemical device can be a battery.

DETAILED DESCRIPTION

Silicon-carbon composite electrodes can be formed by preparing a slurry of silicon and a carbon precursor material, and coating that slurry on a carrier substrate. The slurry can be dried into a green film (e.g., dried mixture) and subsequently separated from the carrier substrate. The unsupported green film can be thermally treated to convert the carbon precursor into carbon. The resulting silicon-carbon composite film can be used as a monolithic self-supporting electrode (e.g., as described in U.S. Pat. No. 9,178,208 entitled "Composite Materials for Electrochemical Storage" and U.S. Patent Application Publication No. 2014/0170498 entitled "Silicon Particles for Battery Electrodes," the entireties of which are hereby incorporated by reference), or can be laminated to an adhesive-coated current collector to create the silicon carbon-composite electrode (e.g., as described in U.S. Pat. No. 9,397,338 entitled "Electrodes, Electrochemical Cells, and Methods of Forming Electrodes and Electrochemical Cells" or U.S. Pat. No. 9,583,757 entitled "Electrodes, Electrochemical Cells, and Methods of Forming Electrodes and Electrochemical Cells," each of which is incorporated by reference herein).

The removal of the green film from the carrier substrate may involve specialized peeling equipment and/or impose certain requirements on the materials. For example, it is desirable that the coated film does not adhere too strongly to the carrier substrate and that the unsupported green film is robust, yet flexible enough to be handled. In some instances, the residual solvent in the slurry is removed via vacuum drying prior to pyrolysis so that individual layers of green film do not bond together (e.g., when stacked on top of one another) during thermal treatment. At the same time, in order to improve the ability to peel the green film from the carrier substrate, it may be useful to retain a certain amount of residual solvent or plasticizer in the green film. The present disclosure describes methods of pyrolysing on sacrificial substrates to advantageously improve the ability to separate the film from the underlying substrate and/or to reduce the processing and material restrictions. In various implementations, the sacrificial substrate can be thermally decomposed with relatively low char yield (e.g., approximately 10% or lower yield), using the same thermal treatment conditions that convert the carbon precursor into carbon.

Figure 1:
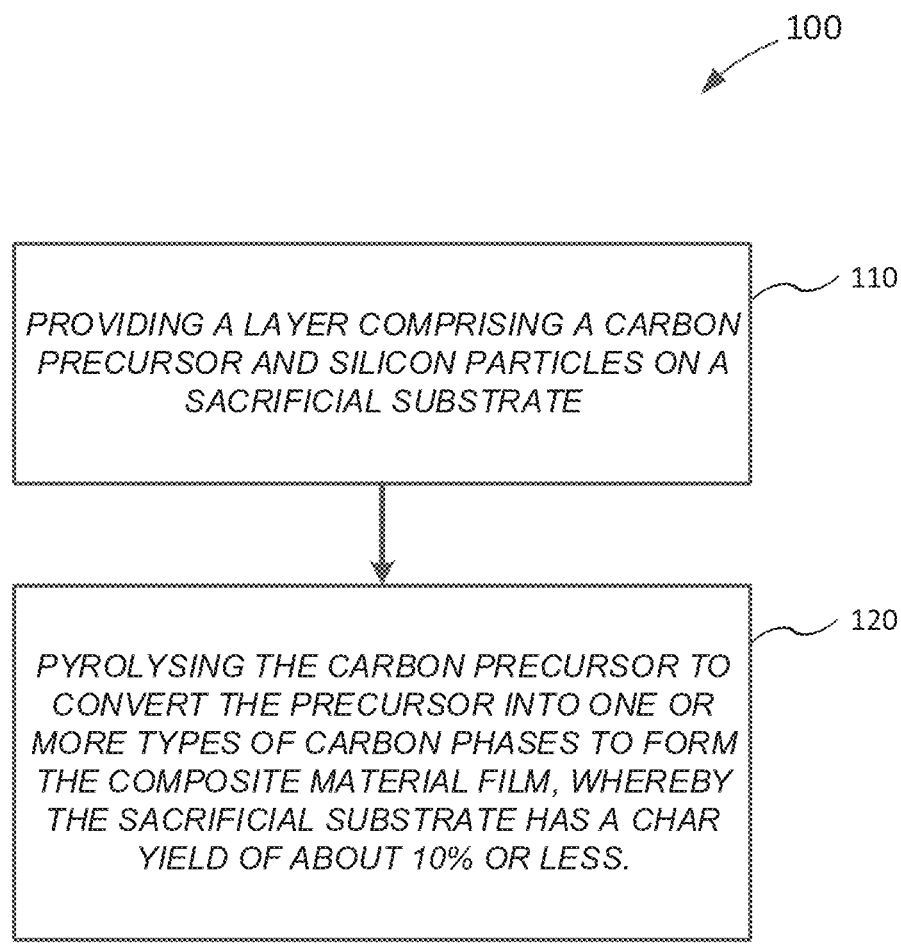
FIG. 1 illustrates an example method of forming a composite material in accordance with certain implementations described herein.

FIG. 1 illustrates an example method of forming a composite material. The method 100 can include providing a layer comprising a carbon precursor and silicon particles on a sacrificial substrate, block 110. The method 100 can further include pyrolysing the carbon precursor to convert the precursor into one or more types of carbon phases to form the composite material film, whereby the sacrificial substrate has a char yield of about 10% or less, block 120.

With reference to block 110, the layer comprising a carbon precursor can be provided on a substrate as described in U.S. Pat. Nos. 9,178,208, 9,397,338, or U.S. Pat. No. 9,583,757. For example, the layer can comprise a mixture. The mixture can include a variety of different components. The mixture can include one or more precursors. In certain embodiments, the precursor is a hydrocarbon compound. For example, the precursor can include polyamic acid, polyimide, etc. Other precursors include phenolic resins, epoxy resins, and other polymers. The mixture can further include a solvent. For example, the solvent can be N-methylpyrollidone (NMP). Other possible solvents include acetone, diethyl ether, gamma butyrolactone, isopropanol, dimethyl carbonate, ethyl carbonate, dimethoxyethane, water, etc. Examples of precursor and solvent solutions include PI-2611 (HD Microsystems), PI-5878G (HD Microsystems) and VTEC PI-1388 (RBI, Inc.). PI-2611 is comprised of >60% n-methyl-2-pyrollidone and 10-30% s-biphenyldianhydride/p-phenylenediamine. PI-5878G is comprised of >60% n-methylpyrrolidone, 10-30% polyamic acid of pyromellitic dianhydride/oxydianiline, 10-30% aromatic hydrocarbon (petroleum distillate) including 5-10% 1,2,4-trimethylbenzene. Another example of precursor and solvent solutions is a water soluble polymer in water. In certain implementations, the amount of precursor (e.g., solid polymer) in the solvent is about 10 wt. % to about 30 wt. %. In general, slurry formulations may contain at least 20 wt % polymer on a solids basis in order for the dried mixture to maintain sufficient flexibility and avoid cracking and crumbling when removed from a carrier substrate. However, when using sacrificial substrates as described herein, the amount of polymer can be reduced. For example, the amount of polymer can be from about 2% to about 10% (e.g., about 2%, about 3%, about 4%, about 5%, about 6%, about 7%, about 8%, about 9%, about 10%, etc.) or from any range formed by such values. Additional materials can also be included in the mixture. For example, silicon particles or carbon particles including graphite active material, chopped or milled carbon fiber, carbon nanofibers, carbon nanotubes, and other conductive carbons can be added to the mixture. In addition, the mixture can be mixed to homogenize the mixture.

In certain embodiments, the mixture is cast on a carrier substrate (e.g., prior to being provided on a sacrificial substrate). The carrier substrate can be glass, ceramic, or metal (e.g., aluminum). In some instances, the carrier substrate can be a polymer, for example, polyethylene terephthalate (PET). In some implementations, casting includes using a gap extrusion or a blade casting technique. The blade casting technique can include applying a coating to the substrate by using a flat surface (e.g., blade) which is controlled to be a certain distance above the substrate. A liquid or slurry can be applied to the substrate, and the blade can be passed over the liquid to spread the liquid over the substrate. The thickness of the coating can be controlled by the gap between the blade and the substrate since the liquid passes through the gap. As the liquid passes through the gap, excess liquid can also be scraped off. For example, the mixture can be cast on a polymer sheet, a polymer roll, or foils or rolls made of glass or metal. The mixture can then be dried to remove at least some of the solvent. For example, a polyamic acid and NMP solution can be dried at about 110° C. for about 2 hours to remove the NMP solution. In some instances, the dried mixture can comprise from about 10% to about 30% of the provided solvent. The dried mixture coated on the carrier substrate can form a green film. The dried mixture can then be removed from the substrate. For example, an aluminum substrate can be etched away with HCl. Alternatively, the dried mixture can be removed from the substrate by peeling or otherwise mechanically removing the dried mixture from the substrate. In certain embodiments, the dried mixture is a precursor film or sheet. In some embodiments, the dried mixture is optionally cured. In some implementations, the dried mixture may be further dried. For example, the dried mixture can be placed in a hot press (e.g., between graphite plates in an oven). A hot press can be used to further dry and/or cure and to keep the dried mixture flat. For example, the dried mixture from a polyamic acid and NMP solution can be hot pressed at about 200° C. for about 8 to 16 hours. Alternatively, the entire process including casting and drying can be done as a roll-to-roll process using standard film-handling equipment. The dried mixture can be rinsed to remove any solvents or etchants that may remain. For example, de-ionized (DI) water can be used to rinse the dried mixture. In some implementations, the mixture can be coated on a substrate by a slot die coating process (e.g., metering a constant or substantially constant weight and/or volume through a set or substantially set gap). In certain embodiments, tape casting techniques can be used for the casting. In some other embodiments, there is no substrate for casting and the anode film does not need to be removed from any substrate.

The dried mixture can be placed on a sacrificial substrate, where it will be pyrolysed. In various implementations, the sacrificial substrate can be thermally decomposed with a relatively low char yield using the same thermal treatment conditions to convert the carbon precursor into carbon. The sacrificial substrate can be any material that can be formed into a film and pyrolysed in inert gas with low residue. In some instances, the sacrificial substrate can have a char yield of about 10% or less (e.g., about 10%, about 9% or less, about 8% or less, about 7% or less, about 6% or less, about 5% or less, about 4% or less, about 3% or less, about 2% or less, about 1% or less, about 0%, etc.). In general, the char yield can be the percent of solid obtained after pyrolysis. In some instances, the sacrificial substrate can have a carbon yield of about 10% or less (e.g., about 10%, about 9% or less, about 8% or less, about 7% or less, about 6% or less, about 5% or less, about 4% or less, about 3% or less, about 2% or less, about 1% or less, about 0%, etc.). Example materials for the sacrificial substrate can include polyethylene, polypropylene, poly(propylene carbonate), or polymethylpentene (PMP). Other examples include acetal copolymer, acrylonitrile butadiene styrene (ABS), paraffin wax, polyethylene oxide, or cellulose acetate. Another example is polystyrene, e.g., with water based solvents. The sacrificial substrate can also be made of a combination (e.g., two or more) of any of these materials. Other materials can also be used.

In some implementations, the sacrificial substrate material can be insoluble in the solvent used in the slurry. For example, a polypropylene substrate may be suitable for use with a slurry containing NMP. As another example, an ABS substrate might not be appropriate if the ABS would dissolve in NMP.

With reference to block 120, the carbon precursor is pyrolysed on the sacrificial substrate. The precursor can be pyrolysed as described in U.S. Pat. Nos. 9,178,208, 9,397,338, or U.S. Pat. No. 9,583,757. For example, the mixture further goes through pyrolysis to convert the precursor to carbon. In certain embodiments, the mixture is pyrolysed in a reducing atmosphere. For example, an inert atmosphere, a vacuum and/or flowing argon, nitrogen, or helium gas can be used. In some embodiments, the mixture is heated to about 900° C. to about 1350° C. For example, polyimide formed from polyamic acid can be carbonized at about 1175° C. for about one hour. In certain embodiments, the heat up rate and/or cool down rate of the mixture is about 10° C./min. After pyrolysis, the char and/or carbon yield of the sacrificial substrate can be about 10% or less (e.g., 10%, 9%, 8%, 7%, 6%, 5%, 4%, 3%, 2%, 1%, 0%, etc.). In various implementations, the pyrolysed carbon has been easily removed from the sacrificial substrate and the remaining low char and/or carbon yield of the sacrificial substrate need not be removed.

In some implementations, instead of providing and drying a mixture on a carrier substrate, removing the green film from the carrier substrate, and providing the green film on a sacrificial substrate, the mixture can be provided and dried directly on the sacrificial substrate to form a bilayer film (e.g., green film and sacrificial substrate). In some instances, the green film can comprise from about 10% to about 30% of the provided solvent. Advantages include reducing the amount of processing and handling steps.

Figure 2:
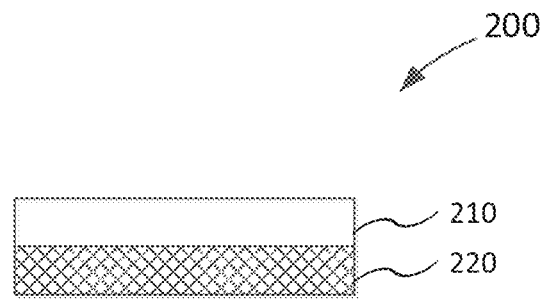
FIG. 2 schematically illustrates an example method of forming a material on a sacrificial substrate.

FIG. 2 schematically illustrates an example of the described methods. In the method 200, a layer 210 of green film is provided on a sacrificial substrate 220. The layer 210 can be provided either indirectly after being removed from a carrier substrate or dried from a mixture provided directly on the sacrificial substrate 220. The layer 210 of green film can be pyrolysed on the sacrificial substrate 220.

Figure 3:
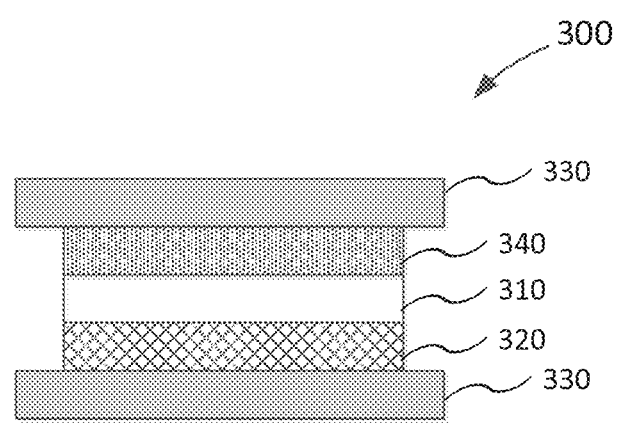
FIG. 3 schematically illustrates another example method of forming a material on a sacrificial substrate.

In some instances, a holder/fixture may be used to keep the mixture in a particular geometry. The holder can be graphite, metal, etc. In certain embodiments, the mixture is held flat. FIG. 3 schematically illustrates an example of the described method. In the method 300, the layer 310 of green film is provided on a sacrificial substrate 320 and held within a holder 330. In some instances, a sacrificial material 340 (e.g., a sacrificial separator/interleaf) can be provided between the layer 310 of green film and the holder/fixture 330. The sacrificial material 340 can have a char and/or carbon yield of about 10% or less (e.g., about 10%, about 9% or less, about 8% or less, about 7% or less, about 6% or less, about 5% or less, about 4% or less, about 3% or less, about 2% or less, about 1% or less, about 0%, etc.). In some instances, the sacrificial material 340 can be the same material as the sacrificial substrate 320. In some instances, the sacrificial material 340 can be a different material than the sacrificial substrate 320. After the green film is pyrolysed, tabs can be attached to the pyrolysed material to form electrical contacts. For example, nickel, copper or alloys thereof can be used for the tabs.

Figure 4:
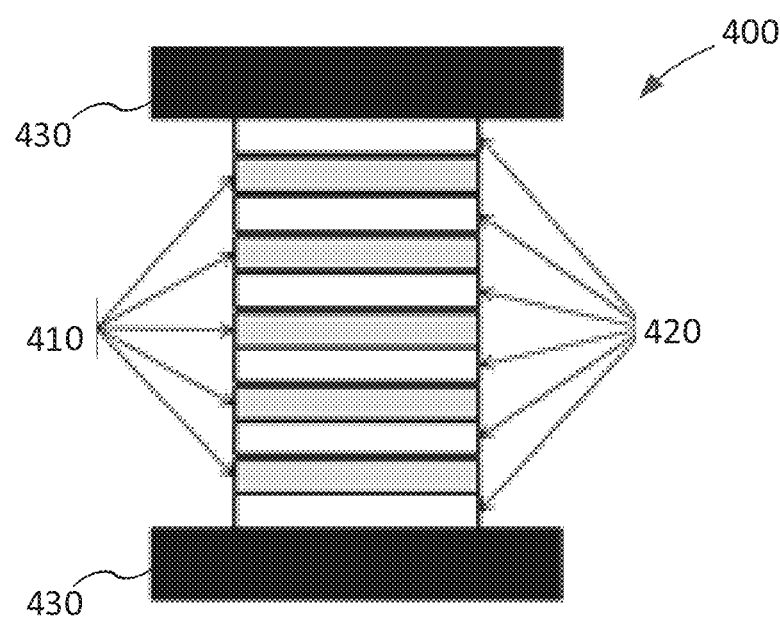
FIG. 4 schematically illustrates an example method of forming a material using sacrificial substrates.

In some implementations, the green film can be formed into a plurality of green films. For example, after being removed from a carrier substrate, the green film may be cut or mechanically sectioned into smaller pieces. FIG. 4 schematically illustrates an example method 400 using a plurality of green films 410 and a plurality of sacrificial substrates 420. As shown, the green films 410 can be provided in a stack with the sacrificial substrates 420. For example, a sacrificial substrate can be provided as a separator/interleaf 420 placed in between two layers of the green film 410. A fixture 430 can be used to keep the green films 410 and sacrificial substrates 420 together during pyrolysis. A sacrificial separator/interleaf 420 can also be placed in between any green film 410 and the fixture 430. In some instances, the green films 410 and sacrificial substrates 420 can also be provided side-by-side and/or in multiple stacks.

Figure 5:
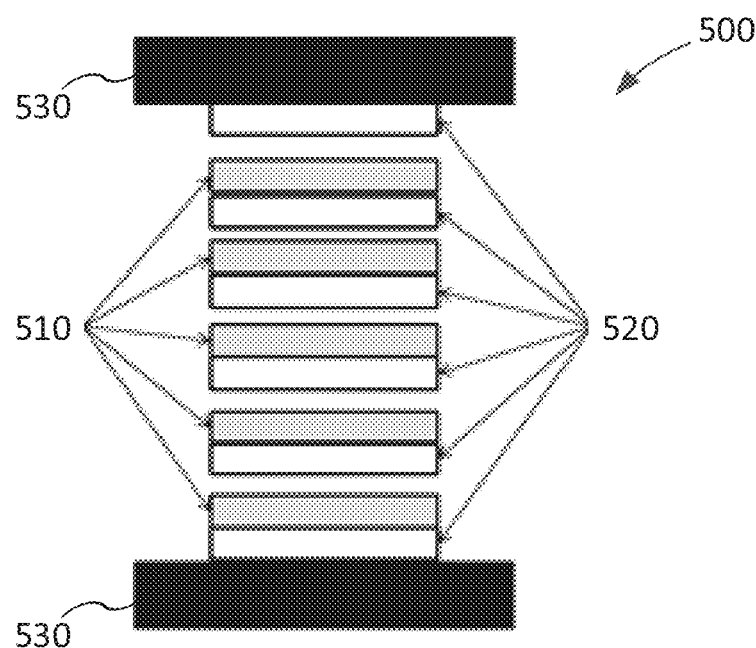
FIG. 5 schematically illustrates another example method of forming a material using sacrificial substrates.

FIG. 5 schematically illustrates another example method 500 of forming a material using sacrificial substrates. In some implementations, the bilayer film (e.g., green film provided either directly or indirectly on a sacrificial substrate) can be formed into a plurality of bilayer films. For example, a bilayer film may be cut or mechanically sectioned into smaller pieces. As shown in FIG. 5, the bilayer film 510/520 can be cut into pieces and stacked within a fixture 530. Although for purposes of illustration, the plurality of bilayer films 510/520 in FIG. 5 is shown with spacing between one another, the bilayer films 510/520 can be stacked on top of one another. A sacrificial separator/interleaf 520 can be placed in between any green film 510 and the fixture 530. The fixture 530 can used to keep the green films 510 and sacrificial substrates 520 together during pyrolysis. In some instances, the green films 510 and sacrificial substrates 520 can also be provided side-by-side and/or in multiple stacks.

In certain embodiments, one or more of the methods described herein is a continuous process. For example, casting, drying, possible curing and pyrolysis can be performed in a continuous process; e.g., the mixture can be coated onto a glass or metal cylinder, removed, and placed on a sacrificial substrate or the mixture can be coated onto the sacrificial substrate. The mixture can be dried while rotating on the cylinder creating a film. The film can be transferred as a roll or peeled and fed into another machine for further processing (e.g., placed on a sacrificial substrate and pyrolysed). Extrusion and other film manufacturing techniques known in industry could also be utilized prior to the pyrolysis step.

Pyrolysis of the precursor results in a carbon material (e.g., at least one carbon phase). In certain embodiments, the carbon material is a hard carbon. In some embodiments, the precursor is any material that can be pyrolysed to form a hard carbon. When the mixture includes one or more additional materials or phases in addition to the carbonized precursor, a composite material can be created. In particular, the mixture can include silicon particles creating a silicon-carbon (e.g., at least one first phase comprising silicon and at least one second phase comprising carbon) or silicon-carbon-carbon (e.g., at least one first phase comprising silicon, at least one second phase comprising carbon, and at least one third phase comprising carbon) composite material. Silicon particles can increase the specific lithium insertion capacity of the composite material. When silicon absorbs lithium ions, it experiences a large volume increase on the order of 300+ volume percent which can cause electrode structural integrity issues. In addition to volumetric expansion related problems, silicon is not inherently electrically conductive, but becomes conductive when it is alloyed with lithium (e.g., lithiation). When silicon de-lithiates, the surface of the silicon losses electrical conductivity. Furthermore, when silicon de-lithiates, the volume decreases which results in the possibility of the silicon particle losing contact with the matrix. The dramatic change in volume also results in mechanical failure of the silicon particle structure, in turn, causing it to pulverize. Pulverization and loss of electrical contact have made it a challenge to use silicon as an active material in lithium-ion batteries. A reduction in the initial size of the silicon particles can prevent further pulverization of the silicon powder as well as minimizing the loss of surface electrical conductivity. Furthermore, adding material to the composite that can elastically deform with the change in volume of the silicon particles can ensure that electrical contact to the surface of the silicon is not lost. For example, the composite material can include carbons such as graphite which contributes to the ability of the composite to absorb expansion and which is also capable of intercalating lithium ions adding to the storage capacity of the electrode (e.g., chemically active). Therefore, the composite material may include one or more types of carbon phases.

In some embodiments, the particle size (e.g., diameter or a largest dimension) of the silicon particles can be less than about 50 µm, less than about 40 µm, less than about 30 µm, less than about 20 µm, less than about 10 µm, less than about 1 µm, between about 10 nm and about 50 µm, between about 10 nm and about 40 µm, between about 10 nm and about 30 µm, between about 10 nm and about 20 µm, between about 0.1 µm and about 20 µm, between about 0.5 µm and about 20 µm, between about 1 µm and about 20 µm, between about 1 µm and about 15 µm, between about 1 µm and about 10 µm, between about 10 nm and about 10 µm, between about 10 nm and about 1 µm, less than about 500 nm, less than about 100 nm, about 100 nm, etc. All, substantially all, or at least some of the silicon particles may comprise the particle size (e.g., diameter or largest dimension) described above. For example, an average particle size (or the average diameter or the average largest dimension) or a median particle size (or the median diameter or the median largest dimension) of the silicon particles can be less than about 50 µm, less than about 40 µm, less than about 30 µm, less than about 20 µm, less than about 10 µm, less than about 1 µm, between about 10 nm and about 50 µm, between about 10 nm and about 40 µm, between about 10 nm and about 30 µm, between about 10 nm and about 20 µm, between about 0.1 µm and about 20 µm, between about 0.5 µm and about 20 µm, between about 1 µm and about 20 µm, between about 1 µm and about 15 µm, between about 1 µm and about 10 µm, between about 10 nm and about 10 µm, between about 10 nm and about 1 µm, less than about 500 nm, less than about 100 nm, about 100 nm, etc. In some embodiments, the silicon particles may have a distribution of particle sizes. For example, at least about 95%, at least about 90%, at least about 85%, at least about 80%, at least about 70%, or at least about 60% of the particles may have the particle size described herein.

The amount of silicon provided in the mixture or in the composite material can be greater than zero percent by weight of the mixture and/or composite material. In certain embodiments, the amount of silicon can be within a range of from about 0% to about 99% by weight of the composite material, including greater than about 0% to about 99% by weight, greater than about 0% to about 95% by weight, greater than about 0% to about 90%, greater than about 0% to about 35% by weight, greater than about 0% to about 25% by weight, from about 10% to about 35% by weight, at least about 30% by weight, from about 30% to about 99% by weight, from about 30% to about 95% by weight, from about 30% to about 90% by weight, from about 30% to about 80% by weight, at least about 50% by weight, from about 50% to about 99% by weight, from about 50% to about 95% by weight, from about 50% to about 90% by weight, from about 50% to about 80% by weight, from about 50% to about 70% by weight, at least about 60% by weight, from about 60% to about 99% by weight, from about 60% to about 95% by weight, from about 60% to about 90% by weight, from about 60% to about 80% by weight, at least about 70% by weight, from about 70% to about 99% by weight, from about 70% to about 95% by weight, from about 70% to about 90% by weight, etc. In various embodiments described herein, the amount of silicon can be 90% or greater by weight, e.g., about 90% or greater to about 95% by weight, about 90% or greater to about 97% by weight, about 90% or greater to about 99% by weight, about 92% or greater to about 99% by weight, about 95% or greater to about 99% by weight, about 97% or greater to about 99% by weight, etc.

Furthermore, the silicon particles may or may not be pure silicon. For example, the silicon particles may be substantially silicon or may be a silicon alloy. In one embodiment, the silicon alloy includes silicon as the primary constituent along with one or more other elements. For example, these elements may include aluminum (Al), iron (Fe), copper (Cu), oxygen (O), or carbon (C).

The amount of carbon obtained from the precursor can be about 50 weight percent from, e.g., polyamic acid. In certain embodiments, the amount of carbon obtained from the precursor in the composite material can be greater than 0% to about 95% by weight such as greater than 0% to about 90% by weight, greater than 0% to about 80% by weight, greater than 0% to about 70% by weight, greater than 0% to about 60% by weight, greater than 0% to about 50% by weight, greater than 0% to about 40% by weight, greater than 0% to about 30% by weight, greater than 0% to about 20% by weight, about 1% to about 95% by weight, about 1% to about 90% by weight, about 1% to about 80% by weight, about 1% to about 70% by weight, about 1% to about 60% by weight, about 1% to about 50% by weight, about 1% to about 40% by weight, about 1% to about 30% by weight, about 1% to about 20% by weight, about 5% to about 95% by weight, about 5% to about 90% by weight, about 5% to about 80% by weight, about 5% to about 70% by weight, about 5% to about 60% by weight, about 5% to about 50% by weight, about 5% to about 40% by weight, about 5% to about 30% by weight, about 5% to about 20% by weight, about 10% to about 95% by weight, about 10% to about 90% by weight, about 10% to about 80% by weight, about 10% to about 70% by weight, about 10% to about 60% by weight, about 10% to about 50% by weight, about 10% to about 40% by weight, about 10% to about 30% by weight, about 10% to about 25% by weight, about 10% to about 20% by weight, etc. For example, the amount of carbon obtained from the precursor can be about 1%, about 5%, about 10% by weight, about 15% by weight, about 20% by weight, about 25% by weight, etc. from the precursor. When the amount of silicon is 90% or greater by weight, the amount of carbon can be 10% or less by weight, e.g., about 0% or greater to about 3% by weight, about 0% or greater to about 5% by weight, about 0% or greater to about 10% by weight, about 1% or greater to about 3% by weight, about 1% or greater to about 5% by weight, about 1% or greater to about 8% by weight, about 1% or greater to about 10% by weight, about 5% or greater to about 10% by weight, etc.

The carbon from the precursor can be hard carbon (e.g., a glassy carbon). Hard carbon can be a carbon that does not convert into graphite even with heating in excess of 2800 degrees Celsius. Precursors that melt or flow during pyrolysis convert into soft carbons and/or graphite with sufficient temperature and/or pressure. Hard carbon may be selected since soft carbon precursors may flow and soft carbons and graphite are mechanically weaker than hard carbons. Other possible hard carbon precursors can include phenolic resins, epoxy resins, and other polymers that have a very high melting point or are crosslinked. In some embodiments, the amount of hard carbon in the composite material can have a value within a range of greater than 0% to about 95% by weight such as greater than 0% to about 90% by weight, greater than 0% to about 80% by weight, greater than 0% to about 70% by weight, greater than 0% to about 60% by weight, greater than 0% to about 50% by weight, greater than 0% to about 40% by weight, greater than 0% to about 30% by weight, greater than 0% to about 20% by weight, about 1% to about 95% by weight, about 1% to about 90% by weight, about 1% to about 80% by weight, about 1% to about 70% by weight, about 1% to about 60% by weight, about 1% to about 50% by weight, about 1% to about 40% by weight, about 1% to about 30% by weight, about 1% to about 20% by weight, about 5% to about 95% by weight, about 5% to about 90% by weight, about 5% to about 80% by weight, about 5% to about 70% by weight, about 5% to about 60% by weight, about 5% to about 50% by weight, about 5% to about 40% by weight, about 5% to about 30% by weight, about 5% to about 20% by weight, about 10% to about 95% by weight, about 10% to about 90% by weight, about 10% to about 80% by weight, about 10% to about 70% by weight, about 10% to about 60% by weight, about 10% to about 50% by weight, about 10% to about 40% by weight, about 10% to about 30% by weight, about 10% to about 25% by weight, about 10% to about 20% by weight, etc. In some embodiments, the amount of hard carbon in the composite material can be about 1% by weight, about 5% by weight, about 10% by weight, about 20% by weight, about 30% by weight, about 40% by weight, about 50% by weight, or more than about 50% by weight. When the amount of silicon is 90% or greater by weight, the amount of hard carbon can be 10% or less by weight, e.g., about 0% or greater to about 3% by weight, about 0% or greater to about 5% by weight, about 0% or greater to about 10% by weight, about 1% or greater to about 3% by weight, about 1% or greater to about 5% by weight, about 1% or greater to about 8% by weight, about 1% or greater to about 10% by weight, about 5% or greater to about 10% by weight, etc.

In certain embodiments, the hard carbon phase is substantially amorphous. In other embodiments, the hard carbon phase is substantially crystalline. In further embodiments, the hard carbon phase includes amorphous and crystalline carbon. The hard carbon phase can be a matrix phase in the composite material. The hard carbon can also be embedded in the pores of the additives including silicon. The hard carbon may react with some of the additives to create some materials at interfaces. For example, there may be a silicon carbide layer between silicon particles and the hard carbon.

In certain embodiments, graphite particles are added to the mixture. Advantageously, graphite can be an electrochemically active material in the battery as well as an elastic deformable material that can respond to volume change of the silicon particles. Graphite is the preferred active anode material for certain classes of lithium-ion batteries currently on the market because it has a low irreversible capacity. Additionally, graphite is softer than hard carbon and can better absorb the volume expansion of silicon additives. In certain embodiments, the particle size (e.g., a diameter or a largest dimension) of the graphite particles can be between about 0.5 microns and about 20 microns. All, substantially all, or at least some of the graphite particles may comprise the particle size (e.g., diameter or largest dimension) described herein. In some embodiments, an average or median particle size (e.g., diameter or largest dimension) of the graphite particles can be between about 0.5 microns and about 20 microns. In some embodiments, the graphite particles may have a distribution of particle sizes. For example, at least about 95%, at least about 90%, at least about 85%, at least about 80%, at least about 70%, or at least about 60% of the particles may have the particle size described herein. In certain embodiments, the composite material can include graphite particles in an amount greater than 0% and less than about 80% by weight, including from about 40% to about 75% by weight, from about 5% to about 30% by weight, from about 5% to about 25% by weight, from about 5% to about 20% by weight, from about 5% to about 15% by weight, etc. When the amount of silicon is 90% or greater by weight, the amount of graphite can be 10% or less by weight, e.g., about 0% or greater to about 3% by weight, about 0% or greater to about 5% by weight, about 0% or greater to about 10% by weight, about 1% or greater to about 3% by weight, about 1% or greater to about 5% by weight, about 1% or greater to about 8% by weight, about 1% or greater to about 10% by weight, about 5% or greater to about 10% by weight, etc.

In certain embodiments, conductive particles which may also be electrochemically active are added to the mixture. Such particles can enable both a more electronically conductive composite as well as a more mechanically deformable composite capable of absorbing the large volumetric change incurred during lithiation and de-lithiation. In certain embodiments, a particle size (e.g., diameter or a largest dimension) of the conductive particles can be between about 10 nanometers and about 7 micrometers. All, substantially all, or at least some of the conductive particles may comprise the particle size (e.g., diameter or largest dimension) described herein. In some embodiments, an average or median particle size (e.g., diameter or largest dimension) of the conductive particles can be between about 10 nm and about 7 micrometers. In some embodiments, the conductive particles may have a distribution of particle sizes. For example, at least about 95%, at least about 90%, at least about 85%, at least about 80%, at least about 70%, or at least about 60% of the particles may have the particle size described herein.

In certain embodiments, the mixture can include conductive particles in an amount greater than zero and up to about 80% by weight. In further embodiments, the composite material can include about 45% to about 80% by weight. The conductive particles can be conductive carbon including carbon blacks, carbon fibers, carbon nanofibers, carbon nanotubes, etc. Many carbons that are considered as conductive additives that are not electrochemically active become active once pyrolysed in a polymer matrix. Alternatively, the conductive particles can be metals or alloys including copper, nickel, or stainless steel. When the amount of silicon is 90% or greater by weight, the amount of conductive particles can be 10% or less by weight, e.g., about 0% or greater to about 3% by weight, about 0% or greater to about 5% by weight, about 0% or greater to about 10% by weight, about 1% or greater to about 3% by weight, about 1% or greater to about 5% by weight, about 1% or greater to about 8% by weight, about 1% or greater to about 10% by weight, about 5% or greater to about 10% by weight, etc.

In certain embodiments, an electrode can include a composite material described herein. For example, a composite material can form a self-supported monolithic electrode. The pyrolysed carbon phase (e.g., hard carbon phase) of the composite material can hold together and structurally support the particles that were added to the mixture. In some instances, the hard carbon phase can be a matrix phase (e.g., glassy in nature) that is a substantially continuous phase. The silicon particles can be homogeneously distributed throughout the hard carbon. In certain embodiments, the self-supported monolithic electrode does not include a separate substrate, collector layer, and/or other supportive structures. In some embodiments, the composite material and/or electrode does not include a polymer beyond trace amounts that remain after pyrolysis of the precursor. In further embodiments, the composite material and/or electrode does not include a non-electrically conductive binder.

The composite material may also include porosity, such as about 1% to about 70% or about 5% to about 50% by volume porosity. For example, the porosity can be about 5% to about 40% by volume porosity.

In some embodiments, the composite material can be attached to a current collector. For example, the composite material can be laminated on a current collector using an electrode attachment substance (e.g., a polymer adhesive). In some embodiments, the composite material may also be formed into a powder. For example, the composite material can be ground into a powder. The composite material powder can be used as an active material for an electrode. For example, the composite material powder can be deposited on a collector in a manner similar to making a conventional electrode structure, as known in the industry.

In certain embodiments, an electrode in an electrochemical device such as a battery or electrochemical cell can include a composite material described herein. The composite can be substantially electrochemically active. The composite material can be used for the anode and/or cathode. The electrochemical device can include electrolyte, and can be a battery. In certain embodiments, the battery is a lithium ion battery. In further embodiments, the battery is a secondary battery, or in other embodiments, the battery is a primary battery.

Furthermore, the full capacity of the composite material may not be utilized during use of battery to improve life of the battery (e.g., number charge and discharge cycles before the battery fails or the performance of the battery decreases below a usability level). For example, a composite material with about 70% by weight silicon particles, about 20% by weight carbon from a precursor, and about 10% by weight graphite may have a maximum gravimetric capacity of about 2000 mAh/g, while the composite material may only be used up to an gravimetric capacity of about 550 to about 850 mAh/g. Although, the maximum gravimetric capacity of the composite material may not be utilized, using the composite material at a lower capacity can still achieve a higher capacity than certain lithium ion batteries. In certain embodiments, the composite material is used or only used at a gravimetric capacity below about 70% of the composite material's maximum gravimetric capacity. For example, the composite material is not used at a gravimetric capacity above about 70% of the composite material's maximum gravimetric capacity. In further embodiments, the composite material is used or only used at a gravimetric capacity below about 50% of the composite material's maximum gravimetric capacity or below about 30% of the composite material's maximum gravimetric capacity.

EXAMPLES

Example 1

In one example, a slurry was prepared from silicon powder, graphite powder, polyamic acid, and N-methyl-2-pyrrolidone. The slurry was coated onto a PET substrate and dried, with a residual solvent content of ~17% and a solid loading of 3.8 mg/cm². The green film was peeled from the PET substrate, cut into pieces, and stacked in a graphite support fixture with an interleaf of polyethylene film (for example, as shown in FIG. 4). The assembly was thermally treated under argon, with a ramp rate of 5° C. per minute up to 1175° C., and a 1 hour dwell at 1175° C. The polyethylene film decomposed, leaving minimal carbon residue (<1%), and the layers of silicon composite film were easily separated. The films were laminated to PAI-coated copper foil to form silicon composite electrodes (e.g., anodes), assembled into cells, and electrochemically tested.

Example 2

In another example, a slurry was prepared from silicon powder, graphite powder, polyamic acid, and N-methyl-2-pyrrolidone. The slurry was coated onto a polypropylene substrate and dried, with a residual solvent content of ~20% and a solid loading of 3.8 mg/cm². The resulting bilayer film was cut into pieces and stacked in a graphite support fixture (for example, as shown in FIG. 5). The assembly was thermally treated under argon, with a ramp rate of 5° C. per minute up to 1175° C., and a 1 hour dwell at 1175° C. The polypropylene film decomposed, leaving minimal carbon residue (<1%), and the layers of silicon composite film were easily separated. The films were laminated to PAI-coated copper foil to form silicon composite electrodes (e.g., anodes), assembled into cells, and electrochemically tested.

Figure 6:
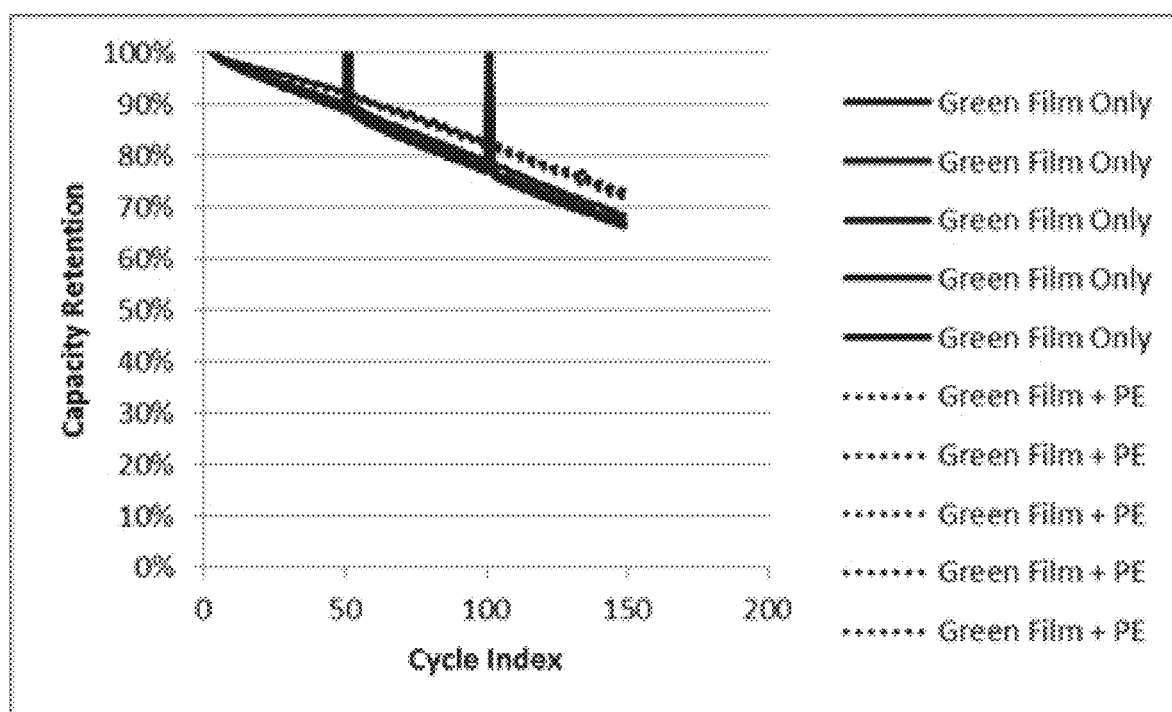
FIG. 6 shows a graph of the capacity retention versus cycle index of electrochemical cells with electrodes prepared with sacrificial substrates using a method as shown in FIG. 4 compared with electrochemical cells with electrodes prepared without sacrificial substrates.

FIG. 6 shows a graph of the capacity retention versus cycle index of electrochemical cells with electrodes prepared with sacrificial substrates using a method as described in Example 1 (e.g., shown in FIG. 4) compared with electrochemical cells with electrodes prepared without sacrificial substrates. The silicon composite electrodes were composed of 80% silicon, 5% graphite, and 15% carbon, with a loading of 3.8 mg/cm$^2$, laminated to a 15 µm thick copper foil coated with a 0.4 mg/cm$^2$ polyamide-imide film. They were assembled into cells with cathodes composed of 97% lithium cobalt oxide, 1% carbon black, 2% PVdF coated on 15 µm thick aluminum foil with a loading of 28 mg/cm$^2$. The electrolyte was composed of 1.2M LiPF$_6$ in FEC/EMC/DEC (2/4/4 vol %)+2 wt % propane sultone+2 wt % adiponitrile. The 620 mAh cells were tested with a 2C-charge rate to 4.3V and a 0.5 C-discharge rate to 3.3V, with a discharge to 2.75V every 50 cycles.

Figure 7:
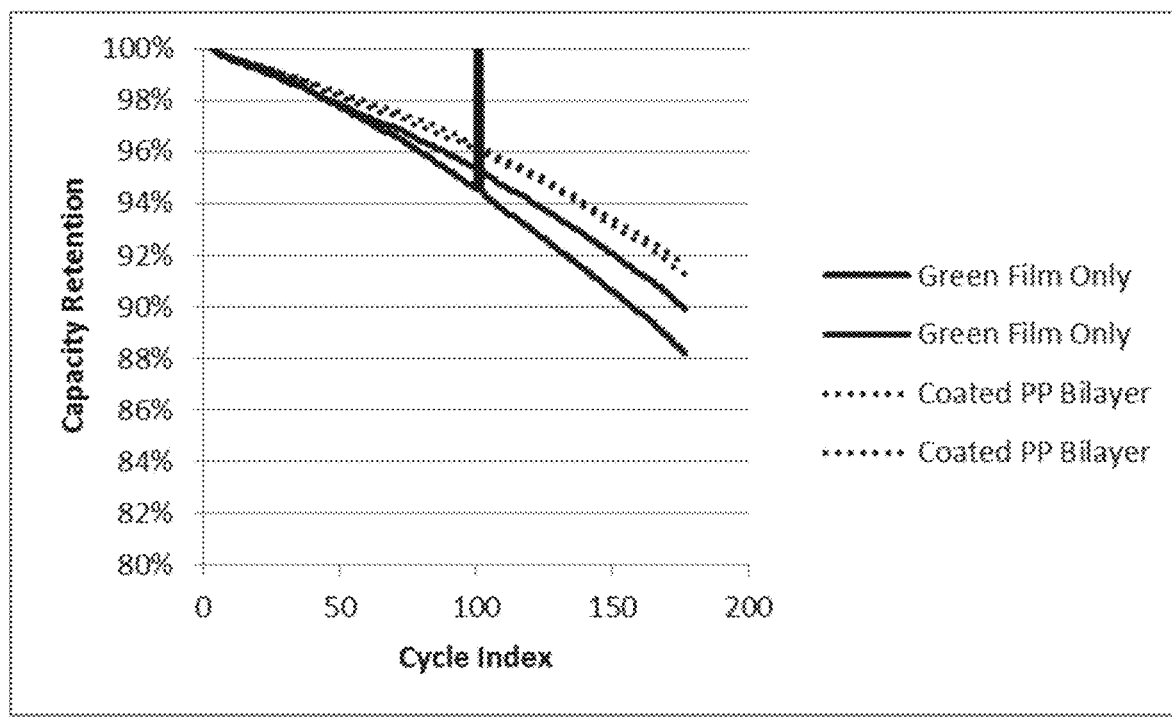
FIG. 7 shows a graph of the capacity retention versus cycle index of electrochemical cells with electrodes prepared with sacrificial substrates using a method as shown in FIG. 5 compared with electrochemical cells with electrodes prepared without sacrificial substrates.

FIG. 7 shows a graph of the capacity retention versus cycle index of electrochemical cells with electrodes prepared with sacrificial substrates using a method as described in Example 2 (e.g., shown in FIG. 5) compared with electrochemical cells with electrodes prepared without sacrificial substrates. The silicon composite electrodes were composed of 80% silicon, 5% graphite, and 15% carbon, with a loading of 3.8 mg/cm$^2$, laminated to a 15 µm thick copper foil coated with a 0.4 mg/cm$^2$ polyamide-imide film. They were assembled into cells with cathodes composed of 92% lithium nickel cobalt manganese oxide, 4% carbon black, 4% PVdF coated on 15 µm thick aluminum foil with a loading of 23 mg/cm$^2$. The electrolyte was composed of 1.2M LiPF$_6$ in FEC/EMC (3/7 wt %). The 565 mAh cells were tested with a 4C-charge rate to 4.2V and a 0.5 C-discharge rate to 3.1V, with a discharge to 3V every 100 cycles.

As shown in FIGS. 6 and 7, cells made with electrodes produced via the methods described herein had improved capacity retention compared to cells made with electrodes produced via a method without using sacrificial substrates.

Without being bound by theory, the reason for the performance improvement may be due to one or more of the following reasons: (1) an increase in carbon content at the surface of the electrode (potentially improving electrical conductivity), (2) an alteration of the pyrolysis conditions (the surface carbon may react more readily with trace oxygen, reducing or preventing degradation of the bulk carbon matrix or further oxidation of the silicon surface), (3) mechanical effects due to the sacrificial film being gasified and also reactions with the gasses created by the sacrificial layer, and/or (4) the sacrificial layer could affect the atmosphere around the electrode being pyrolysed to change the pyrolysis equilibrium during the heat treatment.

The use of sacrificial substrates provides several benefits in the manufacture of silicon composite electrodes. For example, using sacrificial substrates can reduce the formulation and process restrictions required in order to peel the green film and handle it unsupported. This can allow for a higher silicon content (and therefore higher theoretical energy density), and also the use of different carbon precursors (which can reduce cost by using a lower molecular weight, less flexible resin for example). It can also reduce cost by reducing the drying requirements of the material prior to thermal treatment, as the layers of green material can be separated with sacrificial material so that the films are not adjacent and do not bond to each other.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A method of forming a composite material film, the method comprising:
   providing a layer comprising a carbon precursor and silicon particles on a sacrificial substrate, wherein the layer comprises a mixture comprising a solvent;
   drying the mixture on the sacrificial substrate prior to pyrolysing, wherein the dried mixture comprises from about 10% to about 30% of the solvent;
   forming the dried mixture on the sacrificial substrate into a plurality of dried mixtures on sacrificial substrates, and stacking the plurality prior to pyrolyzing; and
   pyrolysing the carbon precursor to convert the precursor into one or more types of carbon phases to form the composite material film, whereby the sacrificial substrate has a char yield of about 10% or less.

2. The method of claim 1, wherein the sacrificial substrate has a char yield of about 7% or less.

3. The method of claim 2, wherein the sacrificial substrate has a char yield of about 5% or less.

4. The method of claim 3, wherein the sacrificial substrate has a char yield of about 3% or less.

5. The method of claim 4, wherein the sacrificial substrate has a char yield of about 1% or less.

6. The method of claim 5, wherein the sacrificial substrate has a char yield of about 0%.

7. The method of claim 1, wherein the sacrificial substrate comprises polymethylpentene (PMP), acetal copolymer, acrylonitrile butadiene styrene (ABS), paraffin wax, polyethylene oxide, polyethylene, polypropylene, poly(propylene carbonate), cellulose acetate, or a combination thereof.

8. The method of claim 7, wherein the sacrificial substrate comprises polyethylene, polypropylene, poly(propylene carbonate), polymethylpentene, or a combination thereof.

9. The method of claim 1, wherein the sacrificial substrate is insoluble in the solvent.

10. The method of claim 1, wherein the solvent comprises N-Methylpyrrolidone (NMP).

11. The method of claim 1, wherein the solvent comprises water.

12. The method of claim 11, wherein the carbon precursor comprises a water soluble polymer.

13. The method of claim 1, wherein the composite material film comprises the one or more types of carbon phases at greater than 0% to about 20% by weight.

14. The method of claim 1, wherein the composite material film comprises the silicon particles at greater than about 50% to about 99% by weight.

15. The method of claim 1, wherein the composite material film further comprises graphite particles.

16. The method of claim 1, wherein the composite material film is substantially electrochemically active.

17. The method of claim 1, wherein pyrolysing forms the composite material film as a self-supported structure.

18. The method according to claim 1, comprising:
   providing a first electrode, wherein providing the first electrode comprises providing the composite material film formed by the method of claim 1;
   providing a second electrode; and
   providing an electrolyte.

19. The method of claim 18, wherein providing the first electrode comprises providing the composite material film as a self-supported electrode.

20. The method of claim 18, wherein providing the first electrode comprises providing the composite material film on a current collector.

21. The method of claim 18, wherein the first electrode is an anode and the second electrode is a cathode.

22. The method of claim 18, comprising:
forming an electrochemical device;
wherein forming the electrochemical device includes providing the first electrode, providing the second electrode, and providing the electrolyte; and
wherein the electrochemical device is a battery.

* * * * *